Jan. 6, 1925.
M. BORDIGNONE
MIRROR FOR SHAVING
Filed Feb. 8, 1924
1,522,412
2 Sheets-Sheet 1
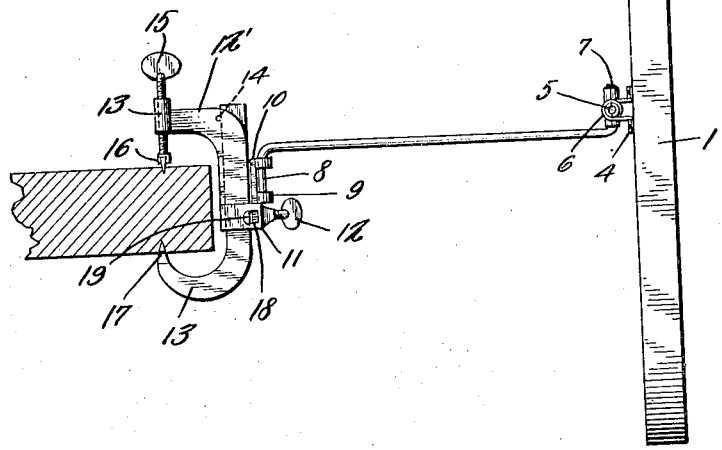
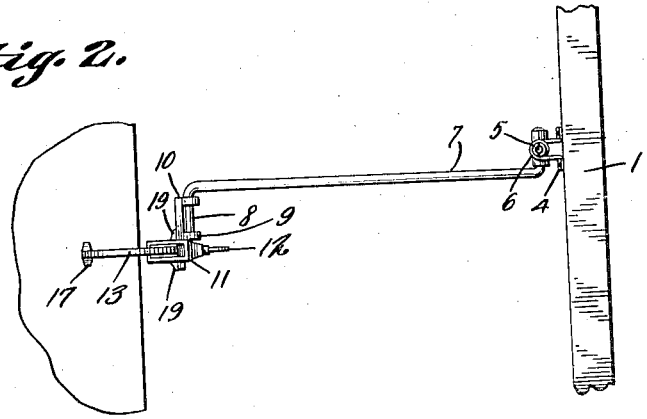
M. Bordignone,
INVENTOR
BY Victor J. Evans
ATTORNEY
WITNESS:

Jan. 6, 1925.
M. BORDIGNONE
1,522,412
MIRROR FOR SHAVING
Filed Feb. 8, 1924
2 Sheets-Sheet 2
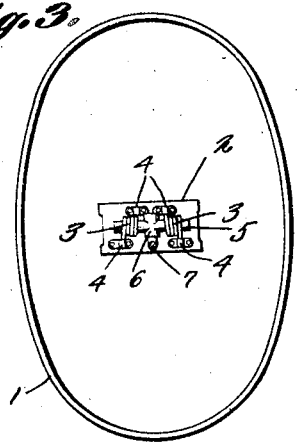
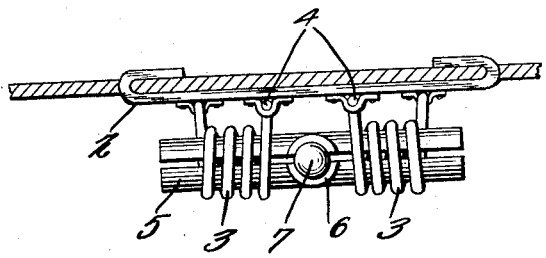
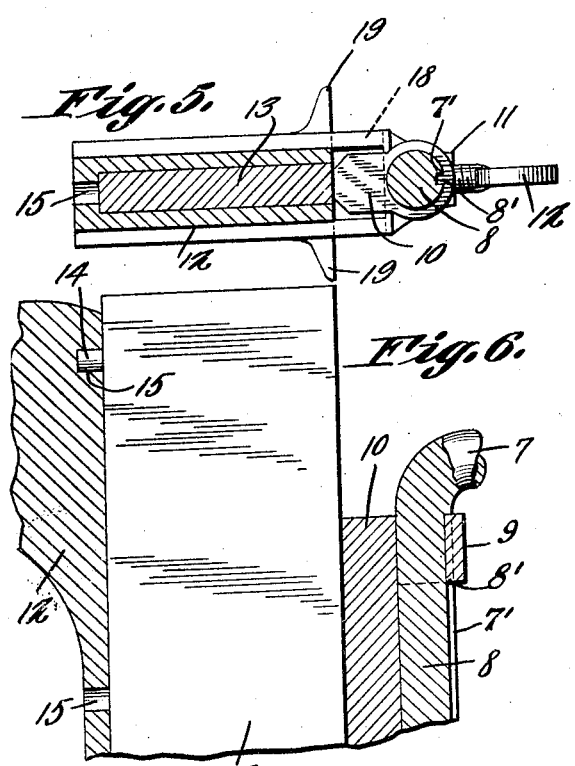
M. Bordignone,
INVENTOR
BY Victor J. Evans
ATTORNEY Patented Jan. 6, 1925.

1,522,412

UNITED STATES PATENT OFFICE.

MARIO BORDIGNONE, OF DETROIT, MICHIGAN.

MIRROR FOR SHAVING.

Application filed February 8, 1924. Serial No. 691,490.

*To all whom it may concern:*

Be it known that I, MARIO BORDIGNONE, a subject of the King of Italy, residing at Detroit, in the county of Wayne and State of Michigan, have invented new and useful Improvements in Mirrors for Shaving, of which the following is a specification.

This invention relates to improvements in mirrors, the general object of the invention being to provide adjustable supporting means for the mirror so that it can be turned into various positions to enable a person to see any part of his face or head, the mirror being mainly designed for shaving purposes.

Another object of the invention is to provide a clamp to which the support of the mirror is adapted to be connected so that the mirror can be attached to a shelf or any other stationary object.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the invention in use with the parts in one position.

Figure 2 is a view showing the parts in another position.

Figure 3 is a rear view of the mirror.

Figure 4 is an enlarged detail view of the plate connected with the back of the mirror and its associated elements.

Figure 5 is a horizontal sectional view taken through the clamping means which forms a portion of the invention.

Figure 6 is a vertical sectional view taken through the clamping means.

Figure 7 is a vertical sectional view taken through the section shown in Figure 4.

Figure 8 is a modified form of the supporting means.

In these views, 1 indicates the mirror which may be of any suitable form though that shown is intended to be used while shaving. A plate 2 is connected with the back of the mirror and a pair of wire coils 3 have their ends 4 connected with the plate in such a manner that the coils are held spaced from the plate. These coils form a bearing for a tubular member 5 which has right angular tubular extensions 6 in its center which form bearings for the bent end of a rod 7. Thus the tubular member has rotary movement in its bearings and the rod has rotary movement in the bearings 6 so that the mirror can be adjusted to almost any position. The coils act to yieldingly support the mirror and thus absorb shocks and the parts are made tight enough to hold the mirror in adjusted position after it is moved. The outer end of the rod 7 is bent in an opposite direction from its inner end, as shown at 8, and this end is adapted to be slidably received in spaced eyed elements 9 on a member 10 which is adapted to be held in the clip 11 by the set screw 12 carried by the clip. The end 8 of the rod is provided with a groove 7' to receive a rib 8' formed in the eyed elements as clearly shown in Figures 5 and 6 of the drawings. The clip is adapted to be carried by a clamping device 12' which consists of the two jaws 13, one jaw having a slot for receiving the shank of the other jaw and the two jaws being held in adjusted position by means of the pin 14 on one jaw engaging any one of a number of holes 15 in the other jaw and the clip which fits over the two jaws and holds the pin in the hole. The large jaw carries a set screw 15' which is provided with a swiveled head 16 having points thereon and the small jaw is provided with the pointed extremity 17. Thus the clamping device can be attached to a shelf, table or other support and as the clip is provided with a hole 18 the member 10 can be held at right angles to the clamp, as shown in Figure 2 or it can be held parallel to the clamp by being placed between the clamp and the clip, as shown in Figure 1. Ears 19 are formed on the clip adjacent the hole 18 to steady the member 10 when engaged with said hole.

From the foregoing it will be seen that I have provided means whereby a shaving or other mirror can be supported and moved to various positions to enable a person to see all parts of his face or head. By providing the clamping member the device can be readily attached to any support at hand. Instead of using the clamping member a clip 20 may be used which is firmly fastened to a support, as shown in Figure 8.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A support for a mirror comprising a plate attached to the rear of the mirror, bearings carried by the plate, a member rotatably supported by the bearings, bearings in the member, a rod having its ends bent and one end engaging the bearings in the member and a means for receiving the other bent end.

2. A support for a mirror comprising a plate connected with the rear of the mirror, a pair of bearings formed on the plate and including a pair of coils having their ends connected with the plate, a tubular member rotatably engaging the coils and having a bearing in its center, a rod having its ends bent with one end engaging the bearing in the member and a means for receiving the other end.

3. A support for a mirror comprising a plate connected with the rear of the mirror, a pair of bearings formed on the plate and including a pair of coils having their ends connected with the plate, a tubular member rotatably engaging the coils and having a bearing in its center, a rod having its ends bent with one end engaging the bearing in the member, a means for receiving the other end and a clamping member for holding the means.

4. A support for a mirror comprising a plate connected with the rear of the mirror, a pair of bearings formed on the plate and including a pair of coils having their ends connected with the plate, a tubular member rotatably engaging the coils and having a bearing in its center, a rod having its ends bent with one end engaging the bearing in the member, an eyed element for receiving the other end, a clamping member for holding the eyed element, said clamping member consisting of two jaw members slidably connected together, one jaw having a pointed extremity, a set screw carried by the other jaw member and having a head provided with a point.

In testimony whereof I affix my signature.

MARIO BORDIGNONE.